United States Patent
Stiller et al.

(10) Patent No.: US 6,672,666 B2
(45) Date of Patent: Jan. 6, 2004

(54) MESH SEAT WITH DISPLACEABLE BOLSTERS

(75) Inventors: Edwin L. Stiller, Auburn Hills, MI (US); Robert Powell, Romulus, MI (US); Sharon St. Pierre, Pinckney, MI (US)

(73) Assignee: GRA★MAG Truck Interior Systems, L.L.C., Novi, MI (US)

( * ) Notice: Subject to any disclaimer, the term of this patent is extended or adjusted under 35 U.S.C. 154(b) by 0 days.

(21) Appl. No.: 10/308,558

(22) Filed: Dec. 3, 2002

(65) Prior Publication Data

US 2003/0127895 A1 Jul. 10, 2003

Related U.S. Application Data

(60) Provisional application No. 60/336,790, filed on Dec. 3, 2001.

(51) Int. Cl.⁷ .................................................. A47C 7/14
(52) U.S. Cl. .............................. 297/284.2; 297/284.9; 297/457.23
(58) Field of Search .......................... 297/284.2, 284.9, 297/452.34, 452.35, 452.23, 200

(56) References Cited

U.S. PATENT DOCUMENTS

| | | | |
|---|---|---|---|
| 2,619,157 A | * 11/1952 | Guyton et al. | 297/284.9 |
| 2,822,034 A | * 2/1958 | Dixon | 297/230.13 |
| 3,208,794 A | * 9/1965 | Gunn | 297/440.11 |
| 4,124,248 A | * 11/1978 | Mayer | 297/204 |
| 4,337,931 A | * 7/1982 | Mundell et al. | 267/102 |
| 4,500,136 A | 2/1985 | Murphy et al. | |
| 4,537,444 A | 8/1985 | Maruyama et al. | |
| 4,636,000 A | 1/1987 | Nishino | |
| 4,679,848 A | 7/1987 | Spierings | |
| 4,679,855 A | 7/1987 | Hattori et al. | |
| 4,883,318 A | * 11/1989 | Adachi | 297/284.11 |
| 4,885,513 A | 12/1989 | Sakamoto et al. | |
| 4,924,162 A | 5/1990 | Sakamoto et al. | |
| 4,938,529 A | 7/1990 | Fourrey | |
| 5,328,236 A | 7/1994 | Mizushima et al. | |
| 5,857,743 A | 1/1999 | Ligon, Sr. et al. | |
| 6,068,336 A | 5/2000 | Schonauer | |

FOREIGN PATENT DOCUMENTS

| | | | |
|---|---|---|---|
| FR | 2587201 A1 | * | 3/1987 |
| JP | 61057435 A | * | 3/1986 |

\* cited by examiner

*Primary Examiner*—Peter M. Cuomo
*Assistant Examiner*—Joseph Edell
(74) *Attorney, Agent, or Firm*—Clark Hill PLC

(57) ABSTRACT

A seat frame assembly for supporting an occupant in an automotive vehicle includes a pair of spaced apart, longitudinally extending side members interconnected by at least one generally transverse cross member defining a horizontal plane therebetween. The seat frame assembly also includes a side bolster frame pivotally secured to at least one of the side members. The side bolster frame is movable between a support position extending laterally outwardly from the side member and angled upwardly from the horizontal plane, and a deflected position extending generally parallel to the horizontal plane. In addition, the seat frame assembly includes a resilient trim cover extending in tension between the side bolster frame and the opposing side member for automatically pivoting the side bolster frame from the support position to the deflected position in response to a load from the occupant on the side bolster frame, thereby facilitating ingress and egress to the occupant on the seat frame assembly.

12 Claims, 3 Drawing Sheets

MESH SEAT WITH DISPLACEABLE BOLSTERS

This application claims the benefit of Provisional application Ser. No. 60/336,790, filed Dec. 3, 2001.

BACKGROUND OF THE INVENTION

1. Field of the Invention

This invention relates to a seat frame assembly for an automotive vehicle. More particularly, the invention relates to a seat frame assembly having at least one side bolster frame that is movable between a support position and a deflected position.

2. Description of the Related Art

An automotive vehicle includes one or more seat assemblies for supporting occupants within a passenger compartment. Seat assemblies typically include a seat cushion and a seat back interconnected to the seat cushion. The seat back supports a back of an occupant seated upon the seat cushion. Both the seat cushion and the seat back include a cellular foam pad encased by a decorative trim cover and supported by a rigid frame structure. The seat cushion and the seat back may also include movable or adjustable side bolsters or side support frames to provide additional support to occupants, particularly during lateral accelerations of the automotive vehicle.

As an alternative to the cellular foam pad mentioned above, the seat cushion or seat back may include an elastomer membrane or mesh suspension extending in tension between a rigid halo frame structure. It is, however, difficult to incorporate the adjustable bolsters into a seat back or seat cushion utilizing the mesh suspension. At the same time, incorporating such adjustable bolsters into the mesh suspension seat back or seat cushion would provide occupants thereof with needed additional support. Thus, it is desirable to provide adjustable bolsters into a seat cushion or seat back design having a mesh suspension.

U.S. Pat. No. 4,938,529 to Fourray discloses a seat including a seat cushion frame having an elastic layer extending thereover. The elastic layer is raised on opposite sides of the seat to form lateral wings projecting from the seat cushion frame. The seat cushion frame includes on each of its sides a plurality of tabs. A U-shaped rod is pivotally mounted to the plurality of tabs on one side of the seat cushion frame. An upper part of the rod is connected to one of the lateral wings of the elastic layer. The rod is connected by a connecting lever to a control device, which includes a cable extending between the rod and a post of a door. In operation, when the door is opened, the door pulls the cable so that the connecting lever and the rod pivot relative to the plurality of tabs. As a result, one of the lateral wings pivots with the rod and clears access to the seat.

SUMMARY OF THE INVENTION

A seat frame assembly for supporting an occupant in an automotive vehicle includes a pair of spaced apart, longitudinally extending side members interconnected by at least one generally transverse cross member defining a horizontal plane therebetween. The seat frame assembly also includes a side bolster frame pivotally secured to at least one of the side members. The side bolster frame is movable between a support position extending laterally outwardly from the side member and angled upwardly from the horizontal plane, and a deflected position extending generally parallel to the horizontal plane. In addition, the seat frame assembly includes a resilient trim cover extending in tension between the side bolster frame and the opposing side member for automatically pivoting the side bolster frame from the support position to the deflected position in response to a load from the occupant on the side bolster frame, thereby facilitating ingress and egress to the occupant on the seat frame assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
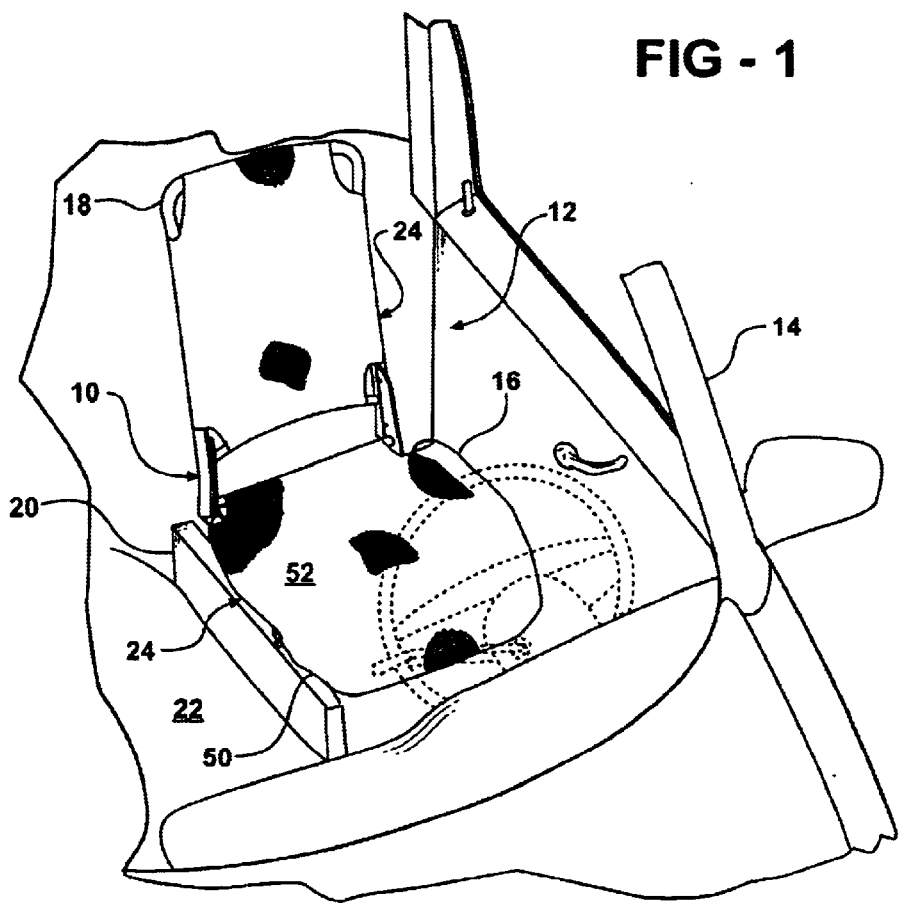
FIG. 1 is a fragmentary perspective view of an automotive vehicle including a seat incorporating a seat frame assembly according to the invention.

Referring to FIG. 1, a seat, generally indicated at 10, is provided for supporting an occupant within a passenger compartment 12 of an automotive vehicle 14. The seat 10 includes a seat cushion 16 and a seat back 18 pivotally secured to the seat cushion 16. A track 20 extends longitudinally along a floor 22 of the automotive vehicle 14 to provide for fore and aft movement of the seat 10. In addition, the track 20 supports the seat cushion 16 in a generally horizontal position above the floor 22.

Figure 2:
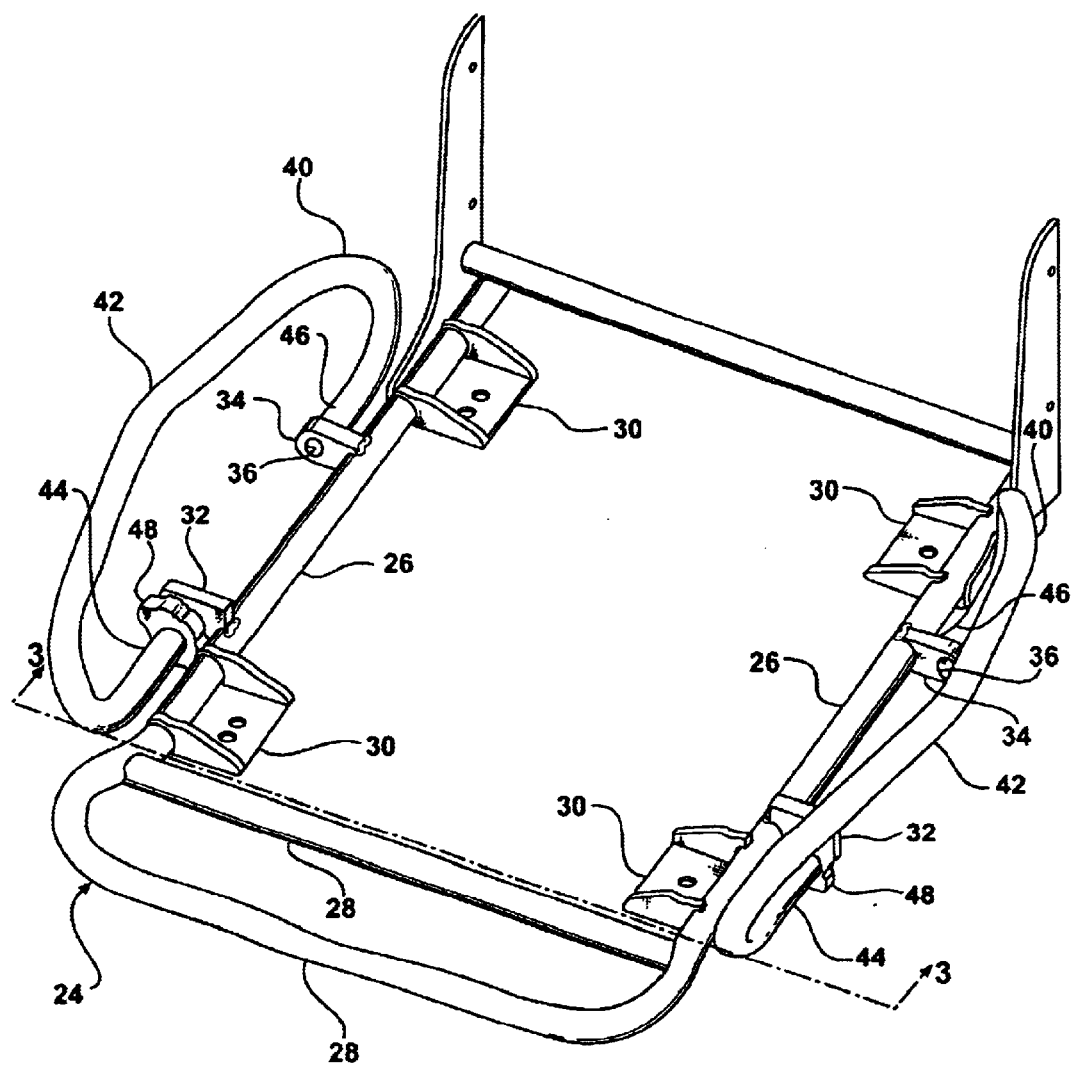
FIG. 2 is a perspective view of the seat frame assembly.

Referring to FIG. 2, a seat frame assembly, generally indicated at 24, for the seat cushion 16 is shown. It will be appreciated that although the seat frame assembly 24 for the seat cushion is illustrated in FIG. 2, the same general construction of the seat frame assembly 24 is utilized for the seat back 18 as well. The seat frame assembly 24 includes a pair of spaced apart, longitudinally extending side members 26 that are interconnected by generally transverse cross members 28. The side members 26 are generally parallel to one another and define a horizontal plane therebetween.

Each of the side members 26 includes mounting brackets 30 extending inwardly therefrom for securing the seat frame assembly 24 to the track 22. Alternatively, the mounting brackets 30 may secure the seat frame assembly 24 directly to the floor 20. A pair of spaced apart pivot brackets 32, 34 extends outwardly from each of the side members 26. A bore 36 is formed in each of the pivot brackets 32, 34.

The seat frame assembly 24 also includes a side bolster frame 40 pivotally secured to each of the side members 26. Each side bolster frame 40 has a longitudinally extending support portion 42 ending in opposing terminal ends 44, 46. The terminal ends 44, 46 each extend axially through the respective bores 36 in the pivot brackets 32, 34 allowing for pivotal movement of the side bolster frames 40 about the side members 26.

Figure 3:
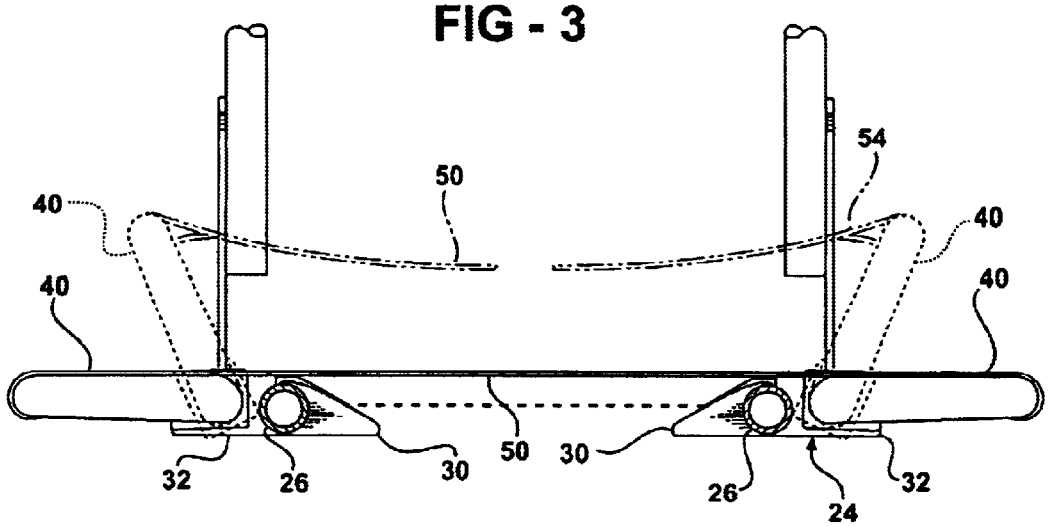
FIG. 3 is a front elevational view, partially cut away, showing side bolster frames in a support position and a deflected position.

Referring to FIG. 3, each of the side bolster frames 40 is movable between a support position extending laterally outwardly from the side member 26 and angled upwardly from the horizontal plane (shown in phantom), and a deflected position extending generally parallel to the horizontal plane (shown in solid). More specifically, when either of the side bolster frames 40 is in its deflected position, the side bolster frame 40 is disposed at an angle of zero degrees relative to the horizontal plane or the side bolster frame 40 extends downwardly from the horizontal plane. Each side bolster frame 40 is independently movable with respect to one another between the support and deflected positions.

Referring back to FIG. 2, a stop pin 48 extends from each pivot bracket 32 and engages the side bolster frames 40 for confining movement thereof between the support and deflected positions. For example, the stop pin 48 prevents either of the side bolster frames 40 from moving inwardly past the support position towards the opposing side member 26. It is contemplated that a tab or similar piece may be formed in each pivot bracket 32 instead of the stop pin 48 to confine movement of the side bolster frames 40.

Figure 4:
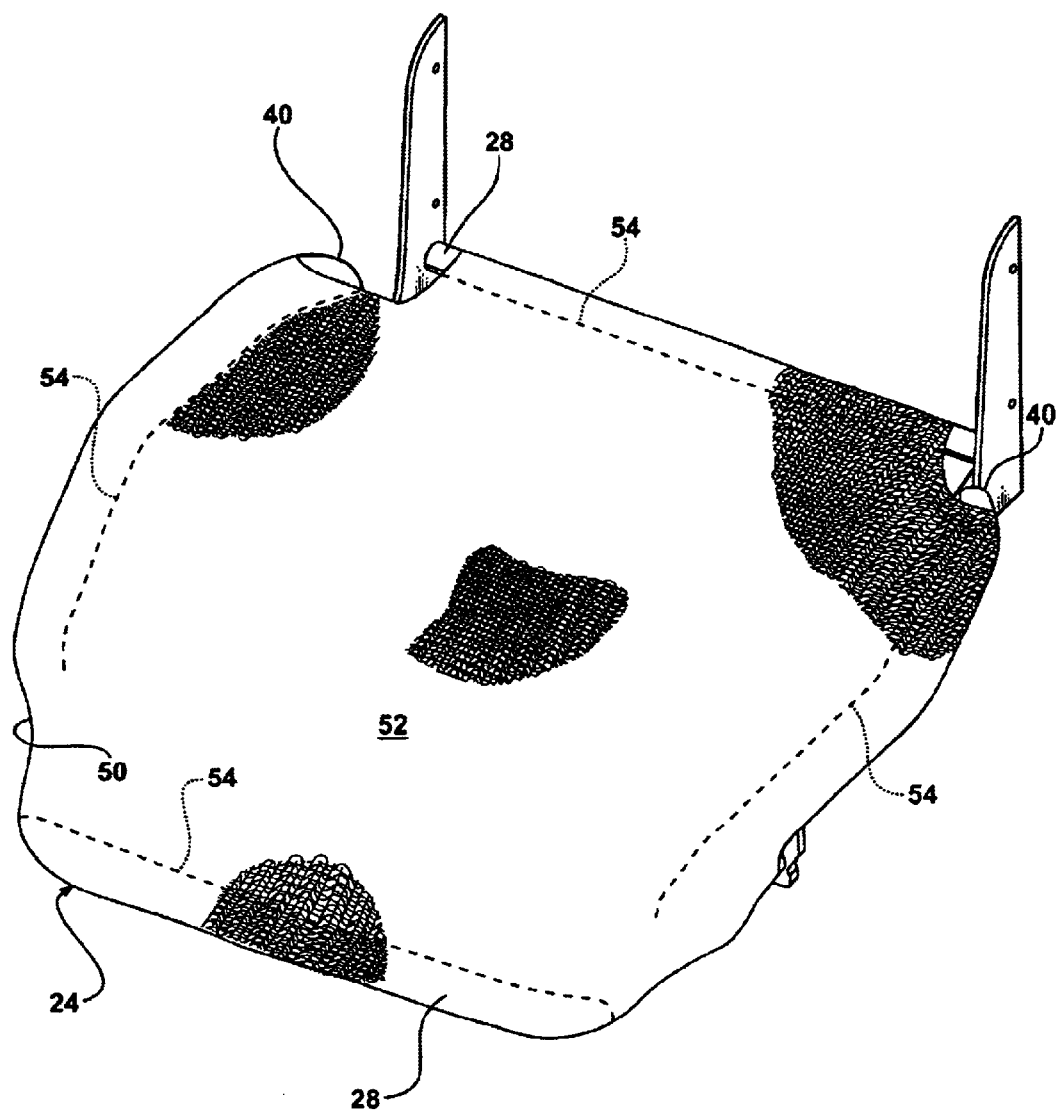
FIG. 4 is a perspective view of the seat frame assembly including a trim cover extending between the side bolster frames.

Referring to FIGS. 3 and 4, the seat frame assembly 24 includes a resilient trim cover 50 for presenting a seating surface 52 to the occupant on the seat frame assembly 24. The trim cover 50 extends in tension between one of the side bolster frames 40 and the opposing side member 26. In the preferred embodiment, the trim cover 50 extends in tension between both of the side bolster frames 40. The tension in the trim cover 50 maintains the side bolster frames 40 in the support position when the seat cushion 16 is unoccupied. In addition, the tension in the trim cover 50 automatically allows the side bolster frame 40 to pivot between the support position and the deflected position in response to a load by the occupant on the side bolster frame 40 to facilitate ingress and egress to the occupant on the seat frame assembly 24.

The trim cover 50 is secured to at least one of the cross members 28 and the side bolster frames 40. The trim cover 50 includes sewn pockets 54 along a trim cover periphery. The pockets 54 may be wrapped around each side bolster frame 40 to secure the trim cover 50 thereto. Alternatively, the trim cover 50 may be secured to the side bolster frames 40 by other suitable attachment devices, including, but not limited to, extruded plastic J-strips or hogrings.

In use, when the occupant is seated upon the seating surface 52, the trim cover 50 is forced downwards relative to the side members 26. At the same time, tension in the trim cover 50 increases, which tends to pull the side bolster frames 40 inwardly towards the support position to provide increased lateral support for the occupant. The stop pins 48 prevent inward movement of the side bolster frames 40 beyond the support position while the occupant is seated on the seating surface 52. During egress of the occupant from the seating surface 52, the occupant applies a load to one of the side bolster frames 40, which displaces the side bolster frame 40 from the support position to the deflected position. As a result, the occupant is able to simply slide over the displaced side bolster frame 40 to exit the seat frame assembly 24. Once the occupant is completely off of the seating surface 52, the tension in the trim cover 50 biases the displaced side bolster frame 40 back to the support position.

Similarly, during ingress of the occupant to the seating surface 52, the occupant applies a load to one of the side bolster frames 40, which displaces the side bolster frame 40 from the support position to the deflected position. The occupant is then able to slide over the displaced side bolster frame 40 onto the seating surface 52. Once the occupant is on the seating surface 52, the tension in the trim cover 50 biases the displaced side bolster frame 40 back to the support position.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat frame assembly for supporting an occupant in an automotive vehicle, said seat frame assembly comprising:

a pair of spaced apart, longitudinally extending side members interconnected by at least one generally transverse cross member defining a generally horizontal plane therebetween;

a side bolster frame pivotally secured to at least one of said side members and movable between a support position extending laterally outwardly from said side member and angled upwardly from said horizontal plane and a deflected position extending generally parallel to said horizontal plane; and a resilient trim cover extending in tension between said side bolster frame and said opposing side member for automatically pivoting said side bolster frame from said support position to said deflected position in response to a load by the occupant on said side bolster frame thereby facilitating ingress and egress to the occupant on said seat frame assembly.

2. A seat frame assembly as set forth in claim 1 further including a first side bolster frame pivotally secured to one of said side members and a second side bolster frame pivotally secured to the other one of said side members.

3. A seat frame assembly as set forth in claim 2 wherein said trim cover extends in tension between said first and second side bolster frames.

4. A seat frame assembly as set forth in claim 3 wherein said trim cover is secured to said first and second side bolster frames.

5. A seat frame assembly as set forth in claim 4 wherein said trim cover is secured to said side members.

6. A seat frame assembly as set forth in claim 5 wherein each of said side members includes a plurality of pivot brackets for pivotally securing said first and second side bolster frames to said side members.

7. A seat frame assembly as set forth in claim 6 wherein a portion of said plurality of pivot brackets includes a stop pin for confining movement of said first and second side bolster frames between said support and deflected positions.

8. A seat frame assembly as set forth in claim 7 wherein said trim cover includes a pocket.

9. A seat frame assembly as set forth in claim 8 wherein said pocket wraps around said first and second side bolster frames to secure said trim cover thereto.

10. A seat frame assembly as set forth in claim 9 wherein said pocket wraps around said side members to secure said trim cover thereto.

11. A seat frame assembly as set forth in claim 10 wherein said trim cover is secured to at least one of said transverse cross members.

12. A seat frame assembly as set forth in claim 11 wherein said side members include mounting brackets extending therefrom for securing said seat frame assembly to the automotive vehicle.

* * * * *